Nov. 20, 1962    C. F. ROGIER    3,064,810
CARD RETRIEVER

Filed Jan. 31, 1956    6 Sheets-Sheet 1

INVENTOR.
CLARENCE F. ROGIER
BY Albert L. Jeffers
ATTORNEY

INVENTOR.
CLARENCE F. ROGIER
BY
*Albert L. Jeffers*
ATTORNEY

United States Patent Office 3,064,810
Patented Nov. 20, 1962

1

3,064,810
CARD RETRIEVER
Clarence F. Rogier, Niles, Ill., assignor to Johnson Fare Box Company, Chicago, Ill., a corporation of Delaware
Filed Jan. 31, 1956, Ser. No. 562,403
8 Claims. (Cl. 209—111.5)

This invention relates generally to a retrieving device, and more particularly to a card key or ticket retriever which is adapted to energize a means to be actuated and to retain the valid card key or ticket.

A salient object of this invention is to provision of a control apparatus for receiving a valid or invalid key or ticket including means for sorting or selecting the valid key or ticket as received so that the invalid key or ticket will be rejected while retaining the valid key or ticket in the apparatus.

Another object of the invention is the provision of a control system which is responsive to a valid key or ticket for controlling an operating means or instrumentality.

It is an object of the invention to provide a conveyor means which is actuated by a power means for transporting a card key or check to a responsive means which determines whether or not the card or check will be retained to energize an operating means.

Another object of the invention is to provide a conveyor means driven by a power unit which is adapted to operate the conveyor in a predetermined fore and aft direction.

A further object of the invention is the provision of responsive means adapted to receive a coded card key or check for actuating means to close a gate or movable support which prevents the return of the key or check whereby the key or check is retained in a depository or receptacle.

A still further object of the invention is to provide means to prevent the operation of the device by tampering therewith.

Yet another object of the invention is to provide a depository or receptacle for receiving the coded card or key.

An important object of this invention is the provision of an actuating mechanism for tilting a card support or gate to deflect the card into a receptacle and reset means for reconditioning the apparatus for the next operation.

A still further object of the invention is the provision of a power unit or power means connected to drive a reversible conveyor, including means for the initial energization of the power means and holding means for continuing the energization of the power means for a predetermined cycle of operation.

An additional object of the invention is the provision of a responsive means, preferably in the form of a lock release operated switch which may be coded for a month, a year, or for any length of time desired.

Another object of the invention is to provide resilient compensating means for the lock switch to prevent damage to the lock when improper cards or checks are inserted therein.

A further object of the invention is the provision of resilient compensating means for the conveyor means to provide tolerance for the card key or check.

A still further object of the invention is the provision of means for resetting or conditioning the retriever for the next operation after it has completed an operating cycle.

An important object of the invention is to provide a unique method of collecting cards or tickets of a predetermined character, which preferably consists in inserting the card or ticket into an entrance opening of an apparatus, moving each ticket from the opening in one direction to a predetermined station within the confines of the apparatus, successively selecting or sorting at the station the tickets of the predetermined character, and then reversing the movement of each card or ticket selected to a predetermined position for discharge at a location spaced from the opening.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Similar characters of reference are employed to designate similar or identical components or portions through the specification and throughout the different views of the drawings.

Figures 1, 2:
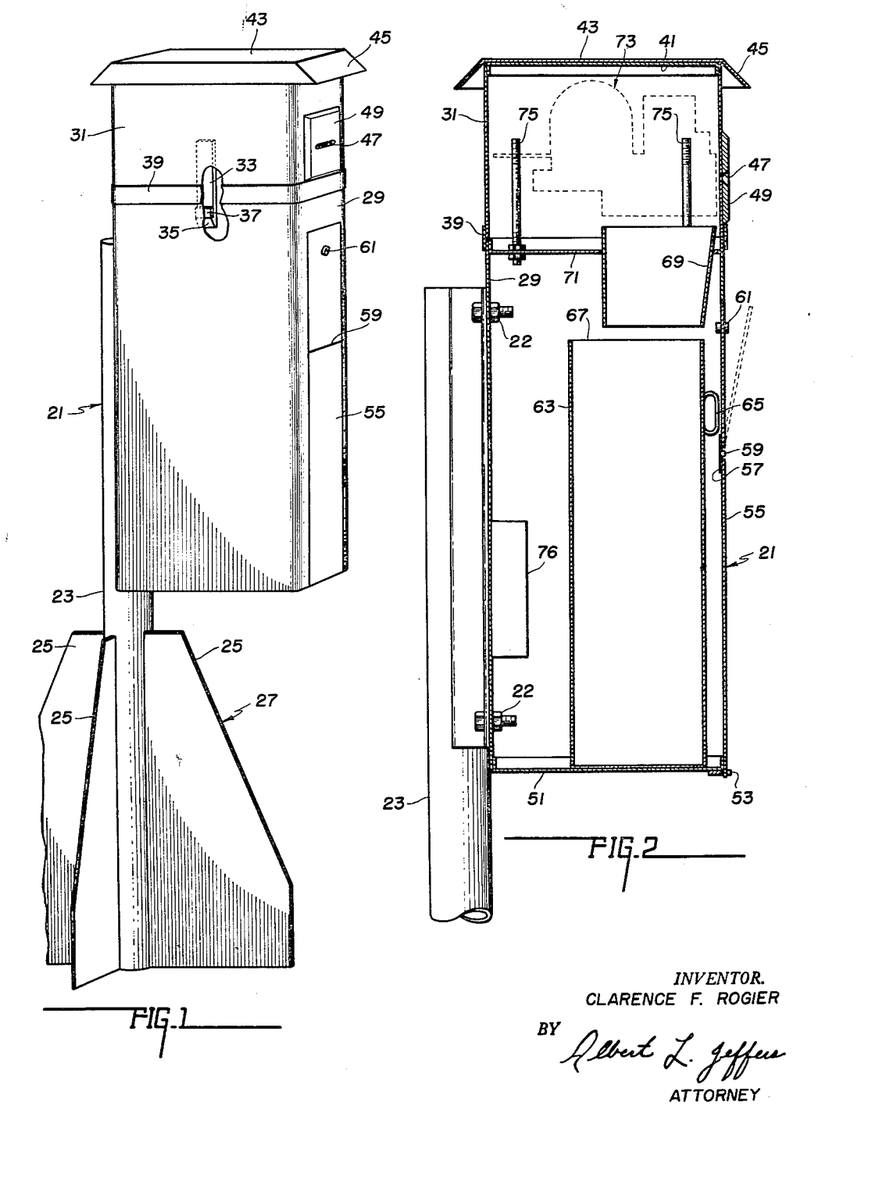
FIGURE 1 is a perspective view with parts cut away illustrating the housing for this invention.
FIGURE 2 is a cross-sectional view showing the mounting of the component within the housing.
Figure 3:
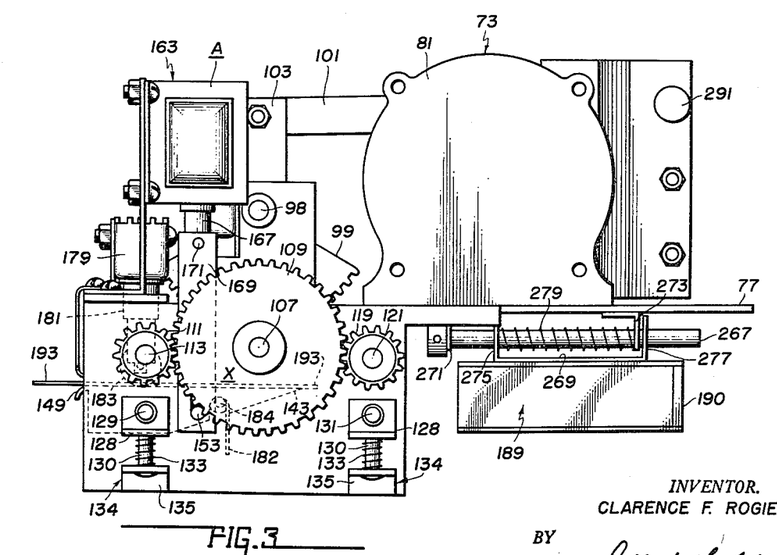
FIGURE 3 is a right side elevation illustrating the retrieving mechanism.
Figure 4:
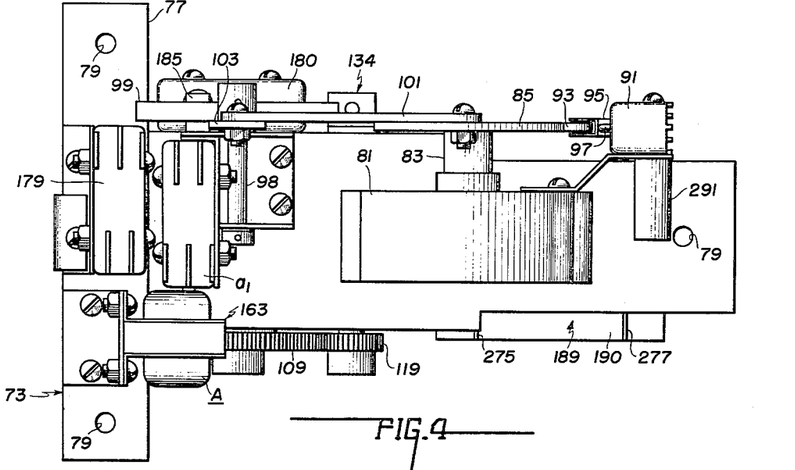
FIGURE 4 is a top view of the mechanism illustrated in FIGURE 3.
Figure 5:
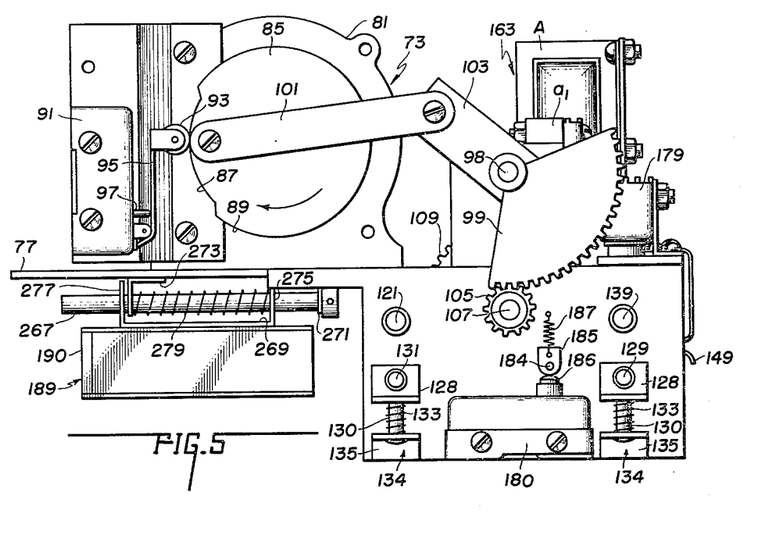
FIGURE 5 is a left side elevation illustrating the retrieving mechanism in the starting position, which will operate the conveyor in a forward direction.
Figure 6:
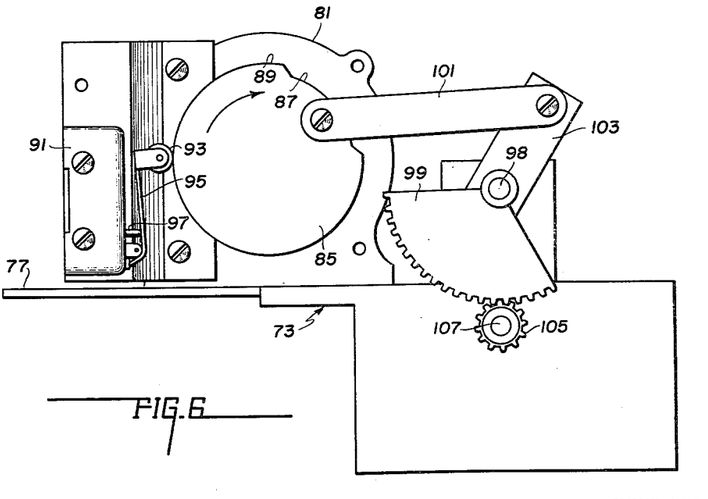
FIGURE 6 is a left side elevation illustrating the retrieving mechanism after completion of one-half of the operating cycle and in a position to reverse the conveyor.

Referring particularly to FIGURE 1 the numeral 21 represents a housing or frame which is mounted by bolts 22 on a post or support 23 provided with radial members 25 to form a pedestal or stand 27.

The housing may be formed into a lower portion or section 29 and an upper portion or section 31 arranged to be held in assembly by a resilient latch 33 having an outward projection 35 which engages a protuberance 37 mounted on the lower section or part of the housing. A band or strip 39 is disposed around the housing and is adapted to engage both the upper and lower portions or sections of the housing. The upper section 31 is provided with a supporting plate or member 41 and a cover 43 having a downwardly projecting flange or overhang 45 for protecting the entrance opening or slot 47 in the plate 49 against the weather.

The lower portion of the housing is provided with a bottom plate 51 and a door locking member or mounting 53 serving to hold the door 55 which is divided by a hinge 57, having a pin 59. The door may be provided with a lock 61. A depository or receptacle 63 having a handle 65 and a top opening 67 is set in the lower portion of housing under the chute or discharge opening 69 which is formed in a supporting plate or member 71 mounted within the housing. The card key or ticket retrieving mechanism 73 is supported on the plate 71 by bolts or studs 75. An electrical control panel 76 is mounted within the housing behind the receptacle 63.

As illustrated in FIGURES 3, 4, 5, 6 and 7 the retrieving mechanism 73 is mounted on a frame 77 provided with openings 79 for receiving the bolts 75.

The numeral 81 designates a power means or unit having a shaft 83 for operative means preferably in the form of a drive cam 85 having a uniform motion with a circumferential surface of different radial extents 87 and 89, respectively.

The cam 85 closes the normally open continuing or holding switch 91 when the follower 93 contacts the circumferential surface 89 through which the resilient arm 95 actuates the plunger 97.

The cam 85 functions further as an eccentric to drive an oscillating member preferably in the form of a reversible segment gear 99, which is mounted on the shaft 98, through the link 101 and arm 103.

The segment gear is in mesh with the pinion gear 105 which is mounted on one end of the shaft 107 and drives the gear 109 which is mounted on the other end of the shaft 107.

The pinion drive gear 109 is in mesh with the pinion gear 111 which is mounted on the stub shaft 113 to rotate the roller 115 (FIGURE 8) forming a first part of the reversible conveyor 117. The pinion gear 119 is mounted on the shaft 121 and is, also, adapted to mesh with the gear 109 to rotate the rollers 123 which form a second part of the conveyor 117. The conveyor is provided with idler rollers 125 and 127 which are mounted on the shafts 129 and 131 respectively. The shafts 129 and 131 (FIGURE 7) are connected at each end to the support assembly 134 comprising a movable member 128, a pin 130, spring 133 and a flange 135 on the frame having an opening (not shown) for receiving the pin. The assembly serves to provide tolerance or compensating means for the objects passing between the rollers.

Figures 7, 8, 9, 10:
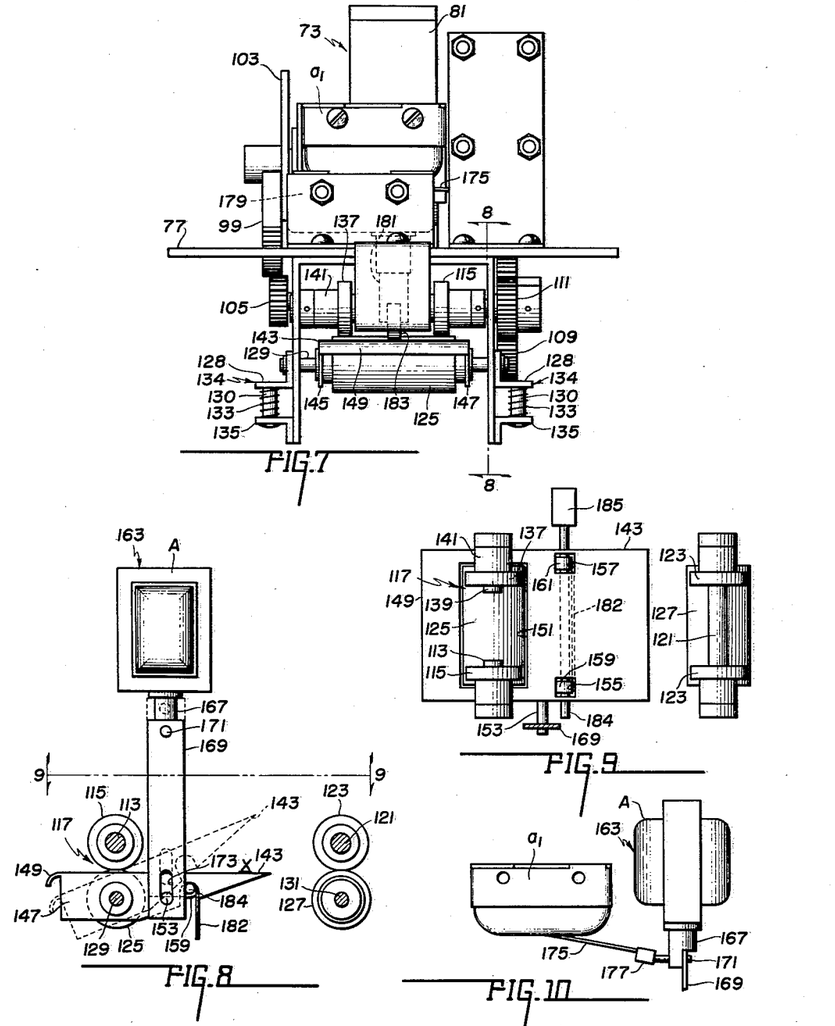
FIGURE 7 is a front elevation of the retrieving mechanism.
FIGURE 8 is a partial elevation view of the gate actuating sub-assembly taken along line 8—8 of FIGURE 7.
FIGURE 9 is a top view of the actuating sub-assembly taken substantially on the line 9—9 of FIGURE 8.
FIGURE 10 is a partial elevation view of the actuating sub-assembly showing the linkage connected to the accept solenoid switch.

The idler roller 137 is mounted on the stub shaft 139 having a spacer 141 to space roller 137 from the frame.

The numeral 143 designates a gate or movable plate having supporting flanges 145 and 147 adapted to pivot on the shaft 129. The plate is provided with a guide or arcuate lip 149 and a rectangular opening 151 for receiving the roller 125. The plate is provided with openings or recesses 155 and 157 to receive the ring connectors 159 and 161.

The actuating means 163 for closing or tilting the gate is preferably in the form of a solenoid A having an armature 167 connected to a link 169 by a pin 171 (FIGURE 10). The link 169 is provided with a longitudinal slot 173 for receiving the pin 153 which is attached to the flange 147. The accept switch contacts $a_1$ are adapted to be actuated by the armature 167 through the arm 175, connector 177 and pin 171.

The initial starting switch 179 for the power unit is disposed between the rollers 115, 137 and is provided with an actuating plunger 181 having a roller 183 projecting in front of the conveyor rollers.

The reset or reconditioning switch 180 is actuated by a plate 182 attached to the mounting rings 159, 161 on the shaft 184 having a cam 185 adapted to operate the reset switch plunger 186. The spring 187 functions to return the cam to its normal position after actuation.

The responsive means is preferably in the form of a lock release operated switch whereby adjustability is provided by means of a manually operated magnetic plug which may be moved into the field of one of the locking pins. The magnetic plug and magnetic pin are disposed with like poles adjacent, thus the locking pin is moved into locking position by the repulsive force of the plug. The card keys or tickets which are issued for a short term only are not provided with a magnetic element which will draw this locking pin out of locking position. On the other hand keys or tickets which are issued for a longer term are provided with such a magnetic element. Thus, at the end of the short term, the plug is manipulated to place the magnetic pin in locking position, thus rendering ineffective the cards or tickets issued for the short term.

The card key or ticket performs the dual function of first unlocking a slide and then moving the slide and the abutting resilient arm toward control means, which is preferably a fixed contact point to complete the circuit of the switch. The first function is effected by bringing magnetic elements disposed in prearranged pattern in the card key or ticket into proper registration with magnetic locking pins arranged in cooperative pattern in the slide, as described in detail hereinafter.

Figure 11:
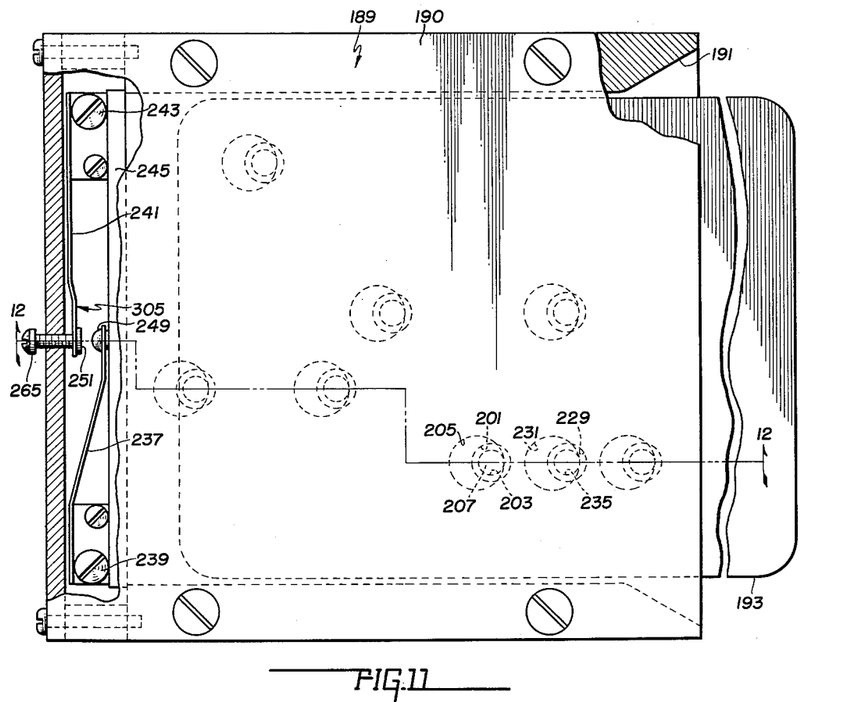
FIGURE 11 is a top view, with parts broken away, of the lock control switch mechanism and coded key.
Figure 12:
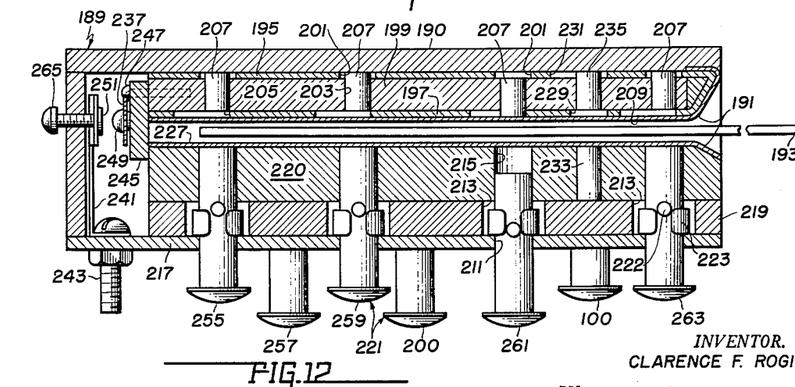
FIGURE 12 is a sectional view of the switch mechanism taken substantially on the line 12—12 of FIGURE 11.

Referring to FIGURES 11 and 12 of the drawing, the responsive or selecting means is preferably in the form of lock switch mechanism 189 which is normally locked in the switch open position and when a valid card key or ticket is inserted the mechanism is unlocked and the switch will be closed by sliding the card or ticket a little further into the lock. The lock switch mechanism 189 is substantially the same as that disclosed in Patent No. 2,842,876 issued to G. E. Chicoine et al. on July 15, 1958, which is an improvement on the lock switch disclosed by Patent No. 2,648,729 issued to Maurice J. Noregaard.

The case or carriage 190 for the switch mechanism is preferably of non-magnetic material and includes a card chute 191 which is fixed and is adapted to receive a suitable ticket, check or card key 193.

A pair of latch plates 195, 197 are mounted in parallel spaced relation above the chute and a slide plate 199 is slidably mounted between the plates.

A number of transverse bores 201, 203 and 205 are formed in a predetermined size and pattern in the latch plate 195, slide 199 and latch plate 197, respectively. The magnetic locking pins 207 are disposed for sliding movement in the bores and are of a length substantially equal to the combined thickness of plate 199 and one of the latch plates 195 or 197. A shield 209 prevents the pins from falling into the chute 191.

A number of transverse bores 211, 213 and 215 are formed in a predetermined size and pattern in the face plate 217, subbase plate 219 and spacing plate 220, respectively. The magnetic plugs 221 extend slightly through the bores 211, 213 and 215. A non-magnetic spring clip member 223 frictionally engages the plug in the area of the bore 213. A pin 222 projects laterally from the plug for frictional engagement in the slot formed between the ends of the clip, whereby the plug may be secured releasably in retracted or projected position, for purposes described in detail hereinafter. A shield 227 prevents the plugs from entering the chute 191.

The plate 197 is provided with a small opening 229 and the plate 195 with a larger opening 231. The spacing plate 220 is perforated transversely to accommodate a magnet 233. It is apparent that locking pin 235 will fall into the smaller opening whenever a magnetic element is disposed in the card key slot in proximity with the small opening. When this occurs the rearward movement of the sliding plate 199 is restricted. It should be noted that since the locking action of locking pin 235 is the reverse of pin 207, it is necessary that the ticket have an appropriate area where there is no metal.

An electrical connection with the member 237 is provided by post 239 which extends through the plate 217. In similar manner, the resilient contact member 241 is secured to plate 217 with an electrical connection being provided by post 243.

The resilient contact member 237 rests against an abutment bar 245 which is secured to the rearward end of the reciprocating locking pin plate 199 by screw 247. The abutment bar 245 projects downwardly across the rearward end of the slot formed between the shields 209, 227 for engagement by the end of card key 193. In this manner, rearward movement of a valid card key or ticket causes the plate 199 and bar 245 to move rearwardly and closes the contact points 249 and 251 of the respective electrical control switch 305 having contact members 237 and 241.

The key or ticket employed to operate the switch described hereinbefore may comprise a card made of fibrous layers in the interior of which are placed a plurality of magnetic elements (not shown) of shim steel or the like. The insertion of a key or ticket will cause the magnet that entered the locking plate to drop down provided the key or card inserted has a metal shim so located that it is positioned between the upper and lower magnets to block the magnetic field.

In the operation of the switch of the present invention, a card key or ticket with properly patterned magnetic elements for cooperation with the arrangement of the plugs 221 is inserted in the slot 191 between the shields 209, 227. The locking pins 207 are permanent magnets having a north and south pole and are repelled by the magnet plugs 221. When one of the plugs 221 is pushed in, the locking pin directly above the pin pushed in enters the opening in the locking plate 195. Upon insertion of a card key 193 having magnetic elements spaced so that they are positioned between the locking pins and plugs, the locking pins will drop down into the opening 205 in the plate 197. The card thus comes in contact with the abutment bar 245 at the end of the slot. As the card is pushed further in the slot, the abutment bar and plate 199 move rearwardly, bringing the electrical contact point 249 into engagement with contact point 251.

The lock 189 is adapted to be used for twelve periods of any length of time by changing the code combination and card key. The code combination of the lock may be set for different periods of time as illustrated in the following table.

| Period | Buttons Pushed In | Buttons Pulled out |
| --- | --- | --- |
| 1 | 200 | 100, 255, 257, 259, 261 and 263. |
| 2 | 260 and 255 | 100. 257, 259, 261 and 263. |
| 3 | 200 and 257 | 100, 255, 259, 261 and 263. |
| 4 | 200 and 259 | 100, 255, 257, 261 and 263. |
| 5 | 200 and 261 | 100, 255, 257, 259 and 263. |
| 6 | 200 and 263 | 100, 255, 257, 259 and 261. |
| 7 | 100 | 200, 255, 257, 259, 261 and 263. |
| 8 | 100 and 255 | 200, 257, 259, 261 and 263. |
| 9 | 100 and 257 | 200, 255, 259, 261 and 263. |
| 10 | 100 and 259 | 200, 255, 257, 261 and 263. |
| 11 | 100 and 261 | 200, 255, 257, 259 and 263. |
| 12 | 100 and 263 | 200, 255, 257, 259 and 261. |

In the event it is desired to operate the lock without any specific card code combination the screw 265 is turned in until the contacts 251, 249 almost touch each other whereby due to the slight play of the plate 199 any type of card will operate the lock.

It may also be desired to provide a grace period after the expiration of a given period. The grace period can be accomplished by arranging the next period card to operate both the expired period and the new period. Assume for example that the combination is being changed from the third period to the fourth period. The fourth period card keys are issued which will operate the lock for both the third and fourth periods. After the expiration of the grace period the third button 257 is pulled out and only the fourth period card keys will operate the lock.

The case or carriage 190 is supported on a rod 267 by a slidable U-shaped bracket 269. A member 271 supports one end of the rod with respect to the frame 77 and a L-shaped stop member 273 disposed between the flanges 275, 277 of the bracket 269 slidably supports the other end of the rod. A spring 279 is mounted on the rod between the flange 275 and member 273 to provide compensating means for the lock when an oversized card or ticket is inserted therein.

Figure 13:
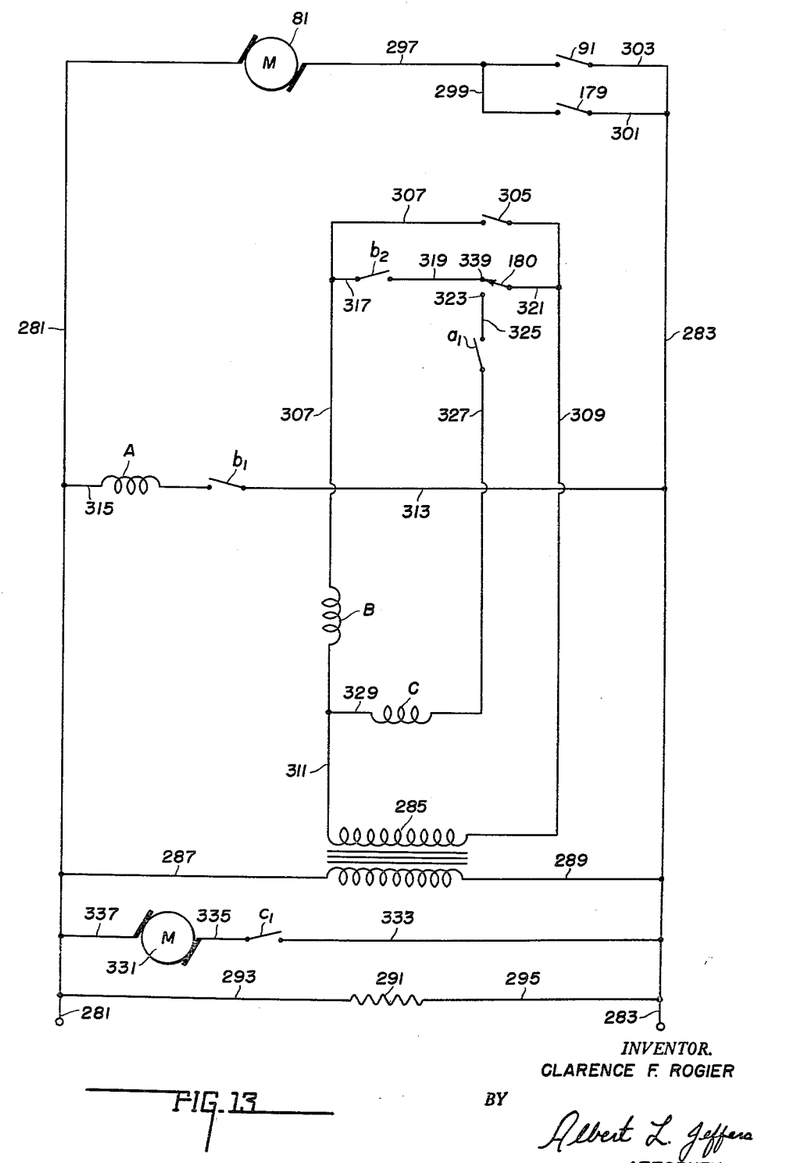
FIGURE 13 is a diagrammatic view of the electrical control circuits used in this invention.

Referring to FIGURE 13, the numerals 281 and 283 designate the power supply mains. The primary of the transformer 285 is connected to the mains through lines 287 and 289 and a heat resister 291 is connected to the mains through lines 293 and 295 to provide a heater for the unit when the equipment is used outdoors.

CIRCUIT A

One side of the motor or power unit 81 is connected to the main 283 throuh lines 297, 299, starting switch 179 and line 301. The other side of the power unit is connected directly with the main 281.

CIRCUIT B

A holding circuit is provided for the power unit through line 297, the cam operated holding switch 91 and line 303.

CIRCUIT C

When a valid card key or ticket is inserted in the responsive means the control switch 305 is closed, thus the holding relay B is energized through line 307 to one side of the relay and the other side through line 309, transformer 285 and line 311 whereby contacts $b_1$ and $b_2$ are closed and the solenoid A is energized through line 313, contact $b_1$ and line 315. The solenoid A serves to close the contacts $a_1$ when energized. A holding circuit is maintained for the continued energization of the relay B through lines 307, 317, contacts $b_2$, line 319, the normally closed reset switch 180, lines 321, and 309 to one side of the transformer 285. The other side of the relay is connected direct to the other side of the transformer through line 311.

CIRCUIT D

As a valid card or ticket falls into the discharge opening or chute 69 the plate 182 will be actuated to move switch 180 to contact 323 whereby the control relay C is energized through line 321, switch 180, line 325, contacts $a_1$, and lines 327, 329. The control relay C serves to close the contacts $c_1$ when energized, thus the means to be actuated or operating means 331 will be energized through line 333, contacts $c_1$, and lines 335 and 337. It should be noted that the card key is elongated and will hold the switch 180 on contact 323 long enough to close the contact C1 to energize the motor 331.

*Operation*

Assuming that a person having a currently valid card or ticket desires to operate a device which is controlled by the apparatus described above, the person will first insert his card key or ticket in the entrance opening 47 (FIGURES 1 and 2) which will actuate the starting switch 179 energizing the power unit 81 through Circuit A.

The power unit 81 will impart movement to the cam 85 to close the holding or continuing switch 91 energizing Circuit B and drive the eccentric which is operatively connected to the segment gear 99 to drive the conveyor 117. The card or ticket is transported by the conveyor along the guide means which defines a longitudinal passageway X extending from the entrance 47 to the responsive or validating means 189.

When a valid card or ticket is received by the responsive means the slide 199 will be released and the control switch 305 is closed energizing Circuit C. The segment gear 99 has reached the position illustrated in FIGURE 6 which is the limit of the forward movement of the conveyor. When the cam 85 reaches a predetermined rotative position, the link 101 will swing or oscillate the segment in the reverse direction.

The rearward travel of the segment gear reverses the direction of the conveyor and transports the card toward the entrance 47. It should be noted that when the Circuit C is energized the solenoid A will tilt the plate or gate 143, around the shaft 129 as shown in broken lines (FIGURE 8) to close the passageway X. The card or ticket will be deflected by the plate into the discharge opening or chute 69 into the container 63.

As the card or ticket falls into the chute, it will actuate the switch plate 182 which moves through cam 185, the switch 180 to contacts 323. Thus the Circuit D will be energized whereby the means to be operated is energized or actuated.

When the switch arm moves to contacts 323 the Circuit C is deenergized and the gate or plate 143 returns to the normal position. The spring 187 which is attached to the cam 185 repositions the switch plate 182 and returns the switch 180 to contact 339, the normally closed position, placing the apparatus in condition for the next operation.

Now let us assume that a person inserts an invalid card or ticket in the entrance. The card will actuate the starting switch 179 energizing the power unit 81 through Circuit A.

The power unit will impart movement to the cam 85 to close holding switch 91 energizing Circuit B and further drive the eccentric which is operatively connected to the segment gear 99 to drive the conveyor 117. The conveyor transports the card or ticket to the responsive means 189 as previously described. The slide 199 will not be released, therefore, the control switch 305 will not be closed and the gate or plate 143 will remain in its normal position. The segment gear reverses the conveyor as previously described and the card will be transported back through the guide means and out the entrance 47.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A control system comprising a power unit, a reversible conveyor adapted to be operated by the power unit, a normally open gate, a controller mechanism, a first switch operable by a key for initiating operation of the power unit to actuate the conveyor to cause it to convey the key in one direction by the gate to the controller mechanism, means for reversing the conveyor to cause it to convey the key in the opposite direction, a second switch operable by the power unit for maintaining the power unit in operation after the first switch is rendered inoperative after the key is released therefrom, actuating means operatively connected to the gate, a third switch for controlling operation of the actuating means, said controller mechanism provided with means for determining whether the key is valid or spurious, said controller mechanism adapted to permit the valid key to actuate the third switch, said third switch when actuated by the key serving to operate the actuating means to close the gate to prevent the key from passing thereby when moved in a reverse direction by the conveyor.

2. A control system comprising a power unit, normally open gate means for admitting a key, means for actuating the gate means, control means spaced from said gate means for controlling the operation of the actuating means, means operated by the power unit for moving the key from the gate means to and from the control means, means disposed between the gate means and control means and responsive to a valid key to permit a valid key to actuate the control means to operate the actuating means to close the gate means to prevent return of the key therethrough.

3. A control system comprising a normally open gate, responsive means for determining whether a key is valid or spurious, a reversible conveyor for moving a key by the gate to and from the responsive means, actuating means for the gate, control means operatively connected to the actuating means, said responsive means adapted to permit a valid key to actuate the control means, and said control means when actuated by the key serving to operate the actuating means to close the gate so that the key will be diverted laterally when moved in a reverse direction by said conveyor.

4. Apparatus of the kind described provided with a discharge opening and comprising a normally open gate, actuating means for moving the gate to a closed position, a control means spaced from the gate for controlling the operation of the actuating means, a conveyor for moving a key over the open gate and to a predetermined station in front of the control means, responsive means at said station for determining whether the key is valid or spurious, said responsive means permitting the valid key to continue its movement and actuate the control means, said control means when operated by the valid key causing the actuating means to move the gate to a closed position, and means for reversing the conveyor to move the key in a reversed direction for engagement with the closed gate so that the valid key may enter the discharge opening without moving back over the gate.

5. Apparatus of the kind described comprising a housing provided with an entrance for receiving a ticket for deposit in the housing, a deflector, means for actuating the deflector, a control mechanism arranged in the housing and operatively connected to the actuating means, means for guiding the ticket toward and away from the control mechanism, said guiding means being provided with a lateral discharge opening spaced from the entrance, and reversible means for moving the ticket forwardly through the guiding means to operate the control mechanism to actuate the deflector so that when the reversible means is reversed to move the ticket rearwardly it will be deflected into the discharge opening by said deflector.

6. The apparatus defined in claim 5, including means for determining whether a ticket is valid or spurious, said determining means adapted to prevent actuation of the deflector when a spurious ticket is determined so that when the spurious ticket is moved rearwardly by the reversible means it will pass back over the discharge opening and deflector and out through the entrance.

7. Apparatus for retrieving tickets, said apparatus comprising guide means forming a passageway with an entrance at one end thereof and an outlet intermediate its ends, a movable member disposed adjacent the outlet for normally closing same, means for moving a ticket forwardly and rearwardly in said passageway, means disposed at the other end of the passageway for determining whether a ticket is valid or spurious, means for moving the member to open the outlet to permit release of a valid ticket selected by said determining means when the ticket is moved in the rearward direction in the passageway, said determining means adapted to maintain the member in a closed position when a spurious ticket is determined so that when the spurious ticket is moved in the rearward direction it will pass over the outlet and be ejected out the entrance.

8. Apparatus of the kind described comprising a power unit, guide means forming a passageway with an entrance adjacent one end thereof for receiving a ticket, a support adjacent the other end of the passageway, stop means, a carriage slidably mounted on the support, a ticket device adapted to test the validity of the ticket carried by the carriage, a conveyor operatively connected to the power unit for moving a ticket along the passageway to said device, and means for normally maintaining the carriage against the stop means for locating said device in a predetermined position for receiving a ticket, said last-mentioned means also serving to permit movement of the carriage and device as a unit relative to the support so that the device will automatically adjust itself to each ticket as received.

References Cited in the file of this patent
UNITED STATES PATENTS

| | | |
|---|---|---|
| 517,012 | Peirce | Mar. 20, 1894 |
| 717,891 | Mills | Jan. 6, 1903 |
| 875,128 | Spaulding | Dec. 31, 1907 |
| 2,105,442 | Murtaugh | Jan. 11, 1938 |
| 2,160,751 | Mills | May 30, 1939 |
| 2,204,845 | Dahlstrom | June 18, 1940 |
| 2,204,897 | Kilpatrick | June 18, 1940 |
| 2,342,573 | Crane et al. | Feb. 22, 1944 |
| 2,648,729 | Noregaard | Aug. 11, 1953 |
| 2,659,470 | Du Pont | Nov. 17, 1953 |
| 2,719,651 | Gabrielsen | Oct. 4, 1955 |
| 2,746,745 | Damon | May 22, 1956 |
| 2,829,475 | Schmidt | Apr. 8, 1958 |
| 2,896,763 | Gisser et al. | July 28, 1959 |
| 2,932,392 | Burtner et al. | Apr. 12, 1960 |